US007468099B2

(12) United States Patent
Katayama

(10) Patent No.: US 7,468,099 B2
(45) Date of Patent: Dec. 23, 2008

(54) IMAGE FORMING APPARATUS

(75) Inventor: Hiromasa Katayama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 548 days.

(21) Appl. No.: 11/251,835

(22) Filed: Oct. 18, 2005

(65) Prior Publication Data

US 2006/0083666 A1 Apr. 20, 2006

(30) Foreign Application Priority Data

Oct. 20, 2004 (JP) ............................ 2004-306262

(51) Int. Cl.
*B01D 53/02* (2006.01)

(52) U.S. Cl. .......................... 96/135; 55/385.1; 55/471; 55/486; 422/177

(58) Field of Classification Search ................ 55/385.1, 55/385.2, 467, 471, 486; 96/135; 422/177
See application file for complete search history.

(56) References Cited

U.S. PATENT DOCUMENTS

| | | | |
|---|---|---|---|
| 2003/0091363 A1 | 5/2003 | Hoffman et al. | |
| 2004/0047646 A1 | 3/2004 | Yon et al. | |

FOREIGN PATENT DOCUMENTS

| | | | |
|---|---|---|---|
| EP | 1 602 989 | | 12/2005 |
| JP | 2-273764 | | 11/1990 |
| JP | 10296042 A | * | 11/1998 |
| JP | 2004-45573 | | 2/2004 |

OTHER PUBLICATIONS

European Office Action dated Nov. 6, 2007, in European Application No. 05 022 455.9.

* cited by examiner

*Primary Examiner*—Robert A Hopkins
(74) *Attorney, Agent, or Firm*—Fitzpatrick, Cella, Harper & Scinto

(57) ABSTRACT

An image forming apparatus includes an image forming portion that forms a toner image on a recording material, in which the image forming portion is provided in a main body of the image forming apparatus, a heating apparatus that heats the toner image on the recording material, the heating apparatus being provided in the main body, a discharge path for discharging air in the main body to an exterior, an adsorption filter provided in the discharge path and capable of removing, by adsorption, a compound in the air discharged through the discharge path, and a catalyst filter provided in the discharge path and capable of removing, by a catalytic decomposition, a compound in the discharged air. The catalyst filter is provided at a downstream side of the adsorption filter, along a direction of air discharge.

6 Claims, 3 Drawing Sheets

IMAGE FORMING APPARATUS

This application claims priority from Japanese Patent Application No. 2004-306262, filed Oct. 20, 2004, which is hereby incorporated by reference herein.

BACKGROUND OF THE INVENTION

1. Field of the Invention

The present invention relates to an image forming apparatus of an electrophotographic process, such as a printer, a copying apparatus or a facsimile apparatus, having an air path for discharging, to the exterior of the apparatus, emission matter employed in the image forming apparatus.

2. Related Background Art

In lithographic printing, a coated paper is often used, in addition to a plain paper, as a recording material. Such a coated paper is formed by coating a surface of a bond paper with a chemical substance, in a glossy or a matted surface. Such coated paper is advantageously employed in color printing, and enables an image presentation having high definition and satisfactory color reproducibility.

On the other hand, in the field of image forming apparatus, such as a printer, a copying machine or a facsimile apparatus (but excluding a printing press utilizing ink), a high-definition image (fine-dot image) is requested, and, faithful color reproducibility is requested by the increase of color documents. For this reason, use of the coated papers is expanding.

When a coated paper is used in a printer or a copying apparatus, a volatile organic compound (VOC) may be generated by heat from the coated paper. Different from the printing press, the printer or the copying apparatus executes a heating process of about 180° C. in a fixing apparatus for fixing a toner image on the recording material, and such heat induces VOC generation from a chemical substance. It is desirable to remove such VOCs.

In the printer, copying apparatus, and the like, the air in the main body of the image forming apparatus is exhausted to the exterior from an exhaust portion, such as an air duct, through an adsorption filter. For example, Japanese Patent Application Laid-Open No. H02-273764 discloses a configuration of combining a catalyst filter and an adsorption filter, in order to decompose ozone of a high concentration.

On the other hand, the role of the adsorption filter is becoming more important in recent years, as a VOC removing filter. Such an adsorption filter is often based on porous active charcoal. Ozone or VOCs generated in the main body of the image forming apparatus is removed by adsorption in the active charcoal.

Since such an adsorption filter achieves gas removal by gas adsorption, it is necessary to increase the hermetic nature of the adsorption filter, in order to absorb VOC gas of a low molecular weight. Such a method can improve the efficiency of VOC removal of low molecular weight, but reduces a gas permeation from the interior to the exterior of the image forming apparatus, whereby the temperature within the image forming apparatus may be elevated, eventually, giving a detrimental influence on toner image forming means, which forms a toner image.

Also, when the VOC concentration becomes high, for example, by a continuous image formation, an increased removal efficiency for the removal of such VOCs lowers the gas permeability of the filter, thereby causing a temperature rise in the image forming apparatus.

On the other hand, such a temperature rise in the apparatus may be reduced by reducing the hermetic property of the adsorption filter in order to increase the gas permeation, but a part of the VOCs may remain without being adsorbed by the adsorption filter.

It is, therefore, desirable to increase the gas permeability while removing VOCs that may remain unabsorbed, without relying on an excessive hermeticity of the adsorption filter.

SUMMARY OF THE INVENTION

An object of the present invention is to remove a volatile organic compound that passes an adsorption filter.

Another object of the present invention is to provide an image forming apparatus including a discharge path for discharging air in a main body of the image forming apparatus to the exterior, an adsorption filter provided in the discharge path and capable of removing, by adsorption, a compound in the air discharged through the discharge path, and a catalyst filter provided in the discharge path and capable of removing, by catalytic decomposition, a compound in the discharged air, wherein the catalyst filter is provided at a downstream side of the adsorption filter, along a direction of air discharge.

Still other objects of the present invention will become fully apparent from the following detailed description, which is to be taken in conjunction with the accompanying drawings.

DETAILED DESCRIPTION OF THE PREFERRED EMBODIMENTS

In the following, embodiments of the present invention will be explained with reference to the accompanying drawings.

Embodiment 1

Figure 1:
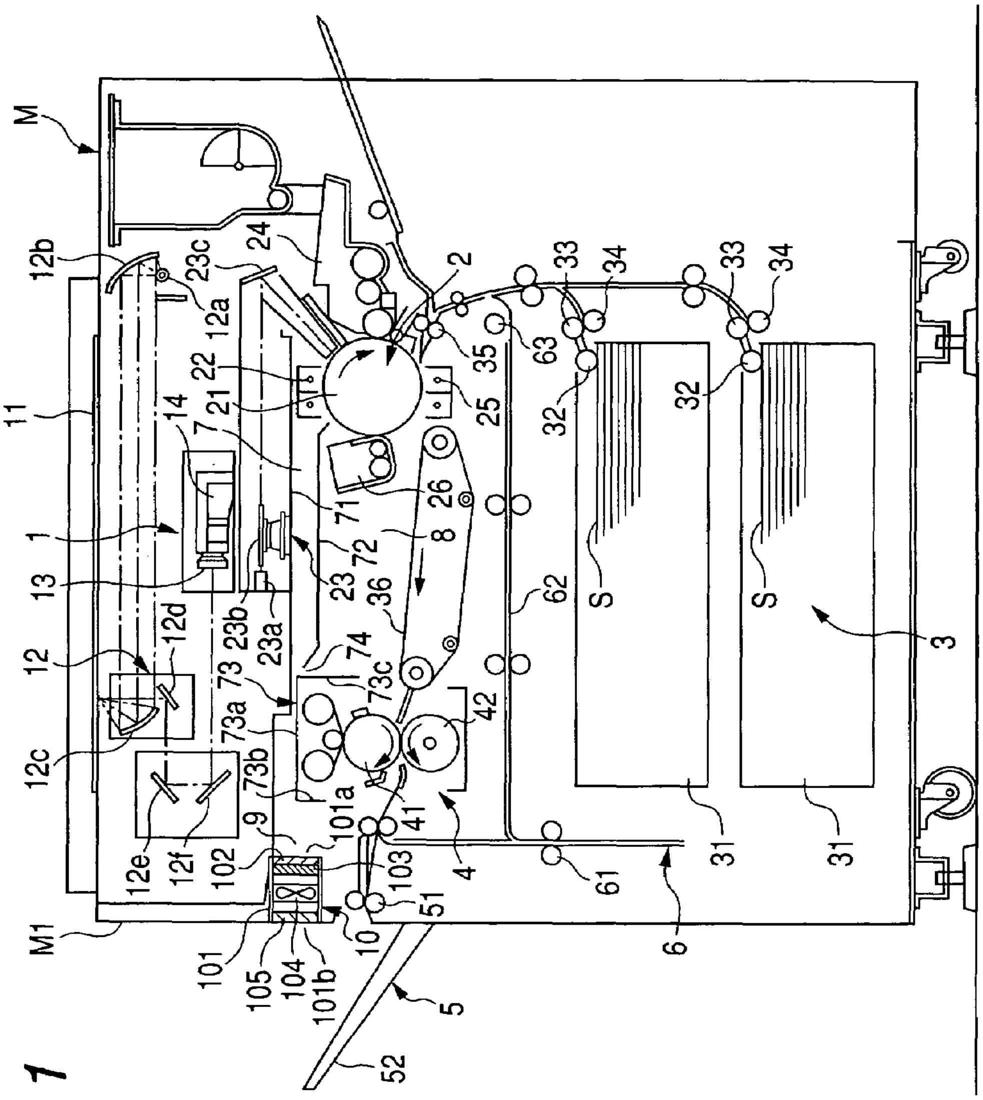
FIG. 1 is a vertical cross-sectional view showing a schematic configuration of an image forming apparatus, in which an air discharge apparatus of the present invention is provided.

FIG. 1 shows an image forming apparatus in which the present invention is applicable. The image forming apparatus shown in FIG. 1 is an electrophotographic printer, and FIG. 1 is a vertical cross-sectional view showing a schematic configuration thereof, seen from a front side (operation side).

The image forming apparatus shown in FIG. 1 is provided with a reader portion 1 for reading an original, an image forming portion 2 for forming an image (toner image) based on the read original, a feed/conveying portion 3 for supplying the image forming portion 2 with a recording material, a fixing portion 4 for fixing the toner image, formed on the recording material by the image forming portion 2, a discharge portion 5 for discharging the recording material after the image fixation, a reversing portion 6 for reversing a front side and a back side of the recording material after the image fixation, and an air discharge portion (air discharge apparatus) 10 for discharging air in a main body M of the image forming apparatus. These portions, except for a part of the discharge portion 5, are provided inside a main body M of a box shape of the image forming apparatus. These portions will be explained in succession, starting from the reader portion 1.

[Reader Portion 1]

The reader portion 1 is provided with an original plate 11, a scanning optical system 12, a reducing lens 13, a CCD 14, etc. The scanning optical system 12 includes a light source 12*a* and reflecting mirrors 12*b*-12*f*.

An original (not shown) placed with an image bearing side thereof downwards on the original plate 11 is illuminated by the light source 12*a* and reflecting mirrors 12*b*, 12*c*. A reflected light is focused through the reduction lens 13 onto the CCD 14 for photoelectric conversion, and is then subjected to an A/D conversion to provide image information, which is transferred to a memory (not shown).

[Image forming portion 2]

The image forming portion 2 is provided with a photosensitive drum 21 as an image bearing member, a corona charger 22 as charging means, an exposure apparatus 23 as exposure means, a developing apparatus 24 as developing means, a transfer charger 25 as transfer means, and a cleaning apparatus 26 as cleaning means. The exposure apparatus 23 is equipped with a laser oscillator 23*a*, a polygon mirror 23*b*, a reflective mirror 23*c*, etc. The photosensitive drum 21 is rotated in a direction indicated by an arrow (clockwise in FIG. 1) with a predetermined process speed (peripheral speed), and is surfacially charged uniformly by the corona charger 22 at a predetermined polarity and potential. On the photosensitive drum 21 after charging, an electrostatic latent image is formed by the exposure apparatus 23. The laser oscillator 23*a* emits a laser beam according to the aforementioned image information. The emitted laser beam scans, by the rotation of the polygon mirror 23*b* and the reflection of the mirror 23*c*, the surface of the photosensitive drum 21 in a direction of a generating line thereof, whereby an electrostatic latent image is formed on the photosensitive drum 21. The electrostatic latent image is developed as a toner image by the developing apparatus 24. The toner image is transferred by the transfer charger 25 onto a recording material S supplied form the feed/conveying portion 3 to be explained below. The photosensitive drum 21, after the toner image transfer, is subjected to a removal of the toner remaining on the surface (transfer residual toner) by the cleaning apparatus 26, and is used for a next image formation. Operations of the corona charger 22 and the transfer charger 25 generate ozone by a corona discharge.

[Feed/Conveying Portion 3]

The feed/conveying portion 3 is provided with sheet cassettes 31, 31, sheet feeding rollers 32, 32, conveying rollers 33, 33, retarding rollers 34, 34, and registration rollers 35. A recording material S, stacked in the sheet cassette 31, is fed by the sheet feed roller 32, and conveyed after a sheet separation by the conveying roller 33 and the retarding roller 34. The conveyed recording material S is stopped once by the registration rollers 35 for correcting a skewing, and is then supplied, in synchronization with the toner image on the photosensitive drum 21, to a transfer portion between the photosensitive drum 21 and the transfer charger 25. The recording material S supplied to the transfer portion receives a transfer of the toner image by the transfer charger 25. The recording material S after the toner image transfer is conveyed by a conveyor belt 36 to the fixing portion 4, to be explained in the following.

[Fixing Portion 4]

The fixing portion 4 as fixing means is provided with a heating roller 41 serving as an image heating member and including therein a halogen heater (not shown) as a heating member, and a pressure roller 42 as a pressure member contacted with the heating roller 41 by a biasing member (not shown) under a predetermined pressure. The recording material S, bearing an unfixed toner image, passes through a fixing nip between the heating roller 41, rotated clockwise in FIG. 1, and the pressure roller 42, rotated counterclockwise in FIG. 1, whereby the toner image is fixed onto the surface under heat and pressure. The heat applied to the recording material S induces evaporation of moisture in the recording material S and VOC generation in a case in which the recording material S is a coated paper.

[Sheet Discharge Portion]

The sheet discharge portion is provided with sheet discharge rollers 51 and a sheet discharge tray 52. The recording material S, after the toner image fixation, is discharged, by the sheet discharge rollers 51, onto the sheet discharge tray 52 provided outside the main body M of the image forming apparatus. In this manner, image formation is completed on one side (front side) of a recording material S.

[Reversing Portion 6]

In the case of image formation on both sides of the recording material S, the recording material S, after the toner image fixation thereon, is not discharged, but is conveyed to paired switchback rollers 61 in a lower part. The recording material S is reversed by its front side and back side, by the forward and reverse rotations of the paired switchback rollers 61, and is conveyed to a two-side conveying path 62. Thereafter, the recording material S is conveyed, for image formation on the back side, to the registration rollers 35 by a re-conveying roller 63. Then, image formation is executed on the back side in a process similar to that on the front side. After the image formation also on the back side, the recording material S is processed in the fixing portion 4, etc., and is discharged onto the tray 52. Thus, the image formations on both sides (front and back sides) of the recording material S are completed.

[Air Discharge Apparatus 10]

In the present embodiment, the image forming apparatus is provided with an air discharge apparatus 10 as a discharge path for discharging the air in the main body M of the image forming apparatus, above the aforementioned sheet discharge rollers 51 at a left-side wall M1 of the main body M.

Figure 2:
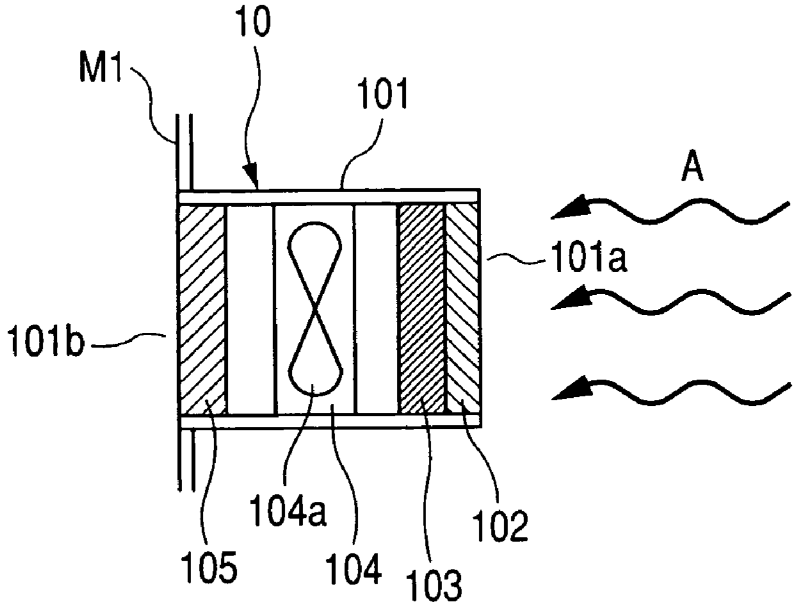
FIG. 2 is a magnified vertical cross-sectional view of the air discharge apparatus of an embodiment 1.

FIG. 2 is a magnified cross-sectional view of the air discharge apparatus shown in FIG. 1. As shown in this drawing, the air discharge apparatus 10 is provided with a duct (air discharge path) 101, and, in a successive order from a deeper side (right-hand side in FIG. 2) of the duct 101, a dust filter 102 for eliminating minute substances, such as dust, an adsorption filter 103, a motor fan 104, serving as a fan, and a VOC oxidation catalyst filter 105, as the catalyst filter.

The duct 101 is formed in a tubular form, and is provided with a suction aperture 101*a*, which is opened toward the interior of the main body M of the image forming apparatus, and a discharge aperture 101*b*, which is opened toward the exterior of the main body M of the image forming apparatus. The duct 101 forms a flow path for air A between the suction aperture 101*a* and the discharge aperture 101*b*. The duct 101 may be formed in a cylindrical shape or a polygonal tubular shape, or an arbitrary shape, according to a restriction in design.

The dust filter 102 is provided in a deepest position (suction aperture 101*a*) in the duct 101, namely, at the most upstream position along the flow of the air A. The dust filter 102 is provided for principally removing flying toner, which is scattered in the air in the main body M of the image forming apparatus.

The adsorption filter 103 is positioned at the downstream side of the dust filter 102. The adsorption filter 103 is constituted of active charcoal supported on a cloth, a non-woven cloth or a thin plate, and is provided principally for mechanically eliminating ozone, in the air in the main body M of the image forming apparatus, by adsorption. The adsorption filter 103, relying on mechanical elimination by adsorption, can also remove VOCs by adsorption, as in the case of ozone.

The motor fan 104 is provided at the downstream side of the ozone filter 103. the motor fan 104 includes a rotatable fan 104*a* and a driving motor (not shown), and forms a flow of the air A in the duct 101.

The VOC oxidation catalyst filter 105 is provided at the downstream side of the motor fan 104, namely, at the discharge aperture 101*b* of the duct 101. The VOC oxidation catalyst filter 105 is constituted of an oxidation catalyst of a precious metal type, such as platinum or palladium, or a base metal type, such as manganese or iron, supported by a base material, such as a cloth, a non-woven cloth or a thin plate. The VOC oxidation catalyst 105 is provided for chemically removing VOCs in the air by oxidation. The VOC oxidation catalyst 105 may be a filter of a honeycomb structure.

The filter for removing VOCs by decomposition in the present invention is different from an ozone filter for decomposing ozone with a catalyst, known in the prior art. Since VOCs are more stable than ozone as a compound, an efficiency of decomposition and removal has to be improved in comparison with the prior ozone filter. In order to improve the decomposing efficiency, the filter preferably has, in addition to a catalytic function, for example, a function of adsorbing thereon VOCs by a material having an adsorbing to the compound, such as active charcoal. Specific examples include a filter having a catalyst layer and an adsorption layer, and a structure formed by coating an adsorbing material on a part of a catalyst filter. Thus, a filter configuration, having active charcoal in addition to a catalyst, decomposes the adsorbed VOC by the catalyst, whereby the VOC itself is made to be less passable through the filter. Otherwise, there may be employed a filter having a permeability lower than that in a prior ozone filter, for example, a filter with a finer honeycomb structure, or a filter with a thicker catalyst layer. Such lowered permeability increases the passing time for VOCs, thereby facilitating decomposition by the catalyst.

In the aforementioned image forming apparatus, within the conveying path for the recording material P, a portion positioned at the downstream side of the registration rollers 35 is generally formed from the right side to the left side, as shown in FIG. 1. The image forming portion 2, the fixing portion 4 and the air discharge apparatus 10, described above, are provided in such a portion, from the upstream side to the downstream side. The image forming portion 2 and the fixing portion 4 are provided at approximately the same heights, while the air discharge apparatus 10 is positioned diagonally above the fixing portion 4.

Also, between the corona charger 22 of the image forming portion 2 and the air discharge apparatus 10, a flow path 7 is provided for guiding the air A in the vicinity of the corona charger 22 to the air discharge apparatus 10. The flow path 7 is constituted of a horizontally provided upper plate 71, a lower plate 72 opposed, from a lower side, to the upper plate 71, and a cover member 73 covering an upper part of the fixing portion 4. Among these, the upper plate 71 has a right-hand end positioned above the corona charger 22, and is extended at a left-hand end substantially horizontally to the left to reach a position above the air discharge apparatus 10. The upper plate 71 separates the reader portion 1 provided in the upper part of the main body M of the image forming apparatus, from other portions, namely, the image forming portion 2, the feed/conveying portion 3, the fixing portion 4, the reversing portion 6, etc. Thus, the reader portion 1 is protected from entry of ozone and flying toner generated in the image forming portion 2 and of VOCs generated in the fixing portion 4. The lower plate 72 has a right-hand end positioned close to a left-hand end of the corona charger 22, and is extended, at a left-hand end, to a position above the right-hand side of the fixing portion 4. The cover member 73 has a horizontal position 73*a*, a right bent portion 73*b* bent downwards from the right-hand end of the horizontal portion, and a left bent portion 73*c* bent downwards from the left-hand end of the horizontal portion 73*a*. Between the right-hand end of the horizontal portion 73*a* and the left-hand edge of the lower plate 72, there is formed an air aperture 74 elongated in a front-back direction. This air aperture 74 connects a flow path 8, formed under the lower plate 72, with the flow path 7, formed above the lower plate 72.

Another flow path 8, different from the aforementioned flow path 7, is formed between the lower plate 72 and the conveyor belt 37, positioned there under, and between the image forming portion 2 and the fixing portion 4 positioned to the left. This flow path 8 principally serves to move the ozone generated in the vicinity of the transfer charger 25 and the flying toner generated in the vicinity of the transfer charger 25 and the cleaning apparatus 26, upwards from the image forming portion 2 to the fixing portion 4 at left, and to further introduce them through the air aperture 74 to the flow path 7 positioned above. In the flow path 8, the conveyor belt 36 rotates in a direction indicated by an arrow, thereby conveying the recording material P from right to left. In the flow path 8, therefore, there is easily formed an air flow, which moves the air A in the vicinity of the image forming portion 2 toward the fixing portion 4. Also, a flow path 9 is formed between the fixing portion 4 and the air discharge apparatus 10, positioned diagonally above.

In the image forming apparatus of the aforementioned configuration, ozone is generated by corona discharge of the corona charger 22 at the primary charging. Ozone is also generated by a corona discharge in the transfer charger 25 at the transfer. Also, flying toner is generated in the vicinity of the transfer charger 25 at the transfer operation and of the cleaning apparatus 26 at the cleaning operation. Furthermore, VOCs are generated in the fixing portion 4 in the case in which a coated paper is used as the recording material P, by the heating of the coated paper.

The ozone, flying toner and VOCs generated in the aforementioned positions are guided to the air discharge apparatus 10, by an air flow generated by the rotation of the fan 104 thereof. More specifically, the ozone generated in the vicinity of the corona charger 22 flows from right to left in FIG. 1 along the flow path 7 and reaches the air discharge apparatus 10. Also, the ozone generated ion the vicinity of the transfer charger 25 and the flying toner generated in the vicinity of the transfer charger 25 and in the vicinity of the cleaning apparatus 26 flow from right to left in FIG. 1 along the flow path 8, and then enters the flow path 7 through the air aperture 74 and reaches the air discharge apparatus 10 through the downstream part of the flow path 7. Also, the VOCs generated in the vicinity of the fixing nip of the fixing portion 4 are brought by a rising air flow generated by the heating at the fixing operation and reach the air discharge apparatus 10 through the flow path 8.

As explained above, the air A guided from the main body M of the image forming apparatus to the air discharge apparatus 10 contains ozone, flying toner and the VOCs. These are sucked from the suction aperture 101*a* of the air discharge apparatus 10 and are satisfactorily removed by the filters before reaching the discharge aperture 101*b*.

The air A, guided to the air discharge apparatus 10, at first passes the duct filter 102, in which the flying toner is removed. The air A, after the removal of the flying toner, then passes the adsorption filter 103. The adsorption filter 103 adsorbs ozone and the VOCs, but cannot remove the VOCs completely. In particular, the VOCs of a low molecular weight are difficult to adsorb.

The VOCs that cannot be removed completely by the adsorption filter 103 are removed by passing through the VOC oxidation catalyst filter 105. Thus, the air A, from which the flying toner, ozone and VOCs are removed, is discharged from the discharge aperture 101*b* of the air discharge apparatus 10 to the exterior of the main body M of the image forming apparatus.

The VOC oxidation catalyst filter 105 cannot generally decompose VOCs having a high concentration, because the chemical reaction is time-consuming. Also, the durability of the catalyst may be deteriorated when the VOCs having a high concentration are decomposed frequently.

However, the air discharge apparatus 10 of the aforementioned configuration, in which the VOC oxidation catalyst filter 105 passes the air A after the VOC concentration is lowered by the adsorption filter 103, can securely remove the VOCs and can maintain the VOC removing ability over a prolonged period. Also, the VOC oxidation catalyst filter 105 can even the VOC of a low molecular weight as the VOC removal is executed by oxidation of the VOCs.

Embodiment 2

Figure 3:
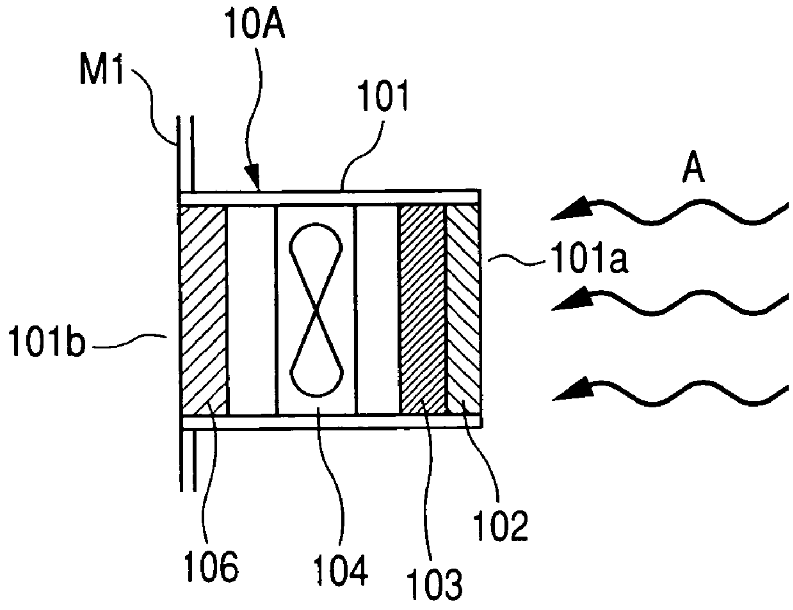
FIG. 3 is a magnified vertical cross-sectional view of the air discharge apparatus of an embodiment 2.

FIG. 3 is a vertical cross-sectional view of an air discharge apparatus 10A of the present embodiment, in which components equivalent to those in the embodiment 1, will be represented by the same symbols, and will not be explained further.

[Air Discharge Apparatus 10A]

The air discharge apparatus 10A of the present embodiment is provided with an ozone decomposition catalyst filter 106, instead of the VOC oxidation catalyst filter 105 in the aforementioned embodiment 1. In the present embodiment, the air discharge apparatus 10A is provided with a duct 101, and, in a successive order from the upstream side of the air flow A, a dust filter 102, an adsorption filter 103, a motor fan 104, and an ozone decomposition catalyst filter 106. The image forming apparatus of the present embodiment is the same in configuration as that of the embodiment 1, except for the air discharge apparatus 10A.

The ozone decomposition catalyst filter 106 may be constructed by supporting an ozone decomposition catalyst, such as manganese dioxide or nickel oxide on a substrate, such as a cloth, a non-woven cloth or a thin plate, but such a substrate is not restrictive.

Ozone and flying toner, generated in the vicinity of the image forming portion 2 in the main body M of the image forming apparatus, and VOCs, generated in the vicinity of the fixing portion 4, are guided, as in embodiment 1, by the motor fan 104 to the air discharge apparatus 10, together with the air in the main body M of the image forming apparatus. The air A, guided to the air discharge apparatus 10, at first passes the dust filter 102, in which the flying toner is removed.

The air A, after removal of the flying toner, then passes the adsorption filter 103. The adsorption filter 103 adsorbs ozone and VOCs, but cannot remove the VOCs completely. In particular, the VOCs having a low molecular weight are difficult to adsorb. The VOCs that cannot be removed completely by the adsorption filter 103 are removed by passing through the ozone decomposition catalyst filter 106, and are discharged to the exterior of the main body M of the image forming apparatus.

In this operation, the ozone decomposition catalyst filter 106 generates a radical (liberated group) by ozone decomposition, and such a radical oxidizes the VOCs, so that low-molecular VOCs, such as formaldehyde, can be eliminated.

In the present embodiment, as in the foregoing embodiment 1, a filter having a VOC adsorbing function (adsorption filter 103 in the present embodiment) is provided at the upstream side of a catalyst filter (ozone decomposition catalyst filter 106 in the present embodiment), so that ozone and VOCs are at first removed by the ozone filter 103 and the VOCs that cannot be completely removed by the ozone filter 103 are decomposed by the ozone decomposition catalyst filter 106. Therefore, the air discharge apparatus 10 can securely remove VOCs and can also maintain the VOC removing ability over a prolonged period.

Embodiment 3

In the air discharge apparatus of the present invention, as long as a filter capable of adsorbing VOCs is provided at the upstream side and a filter capable of decomposing VOCs is provided at the downstream side, positions of the duct 101, the dust filter 102, the motor 104, etc., can be selected arbitrarily. Also, the dust filter 102 may be dispensed with.

Figure 4A:
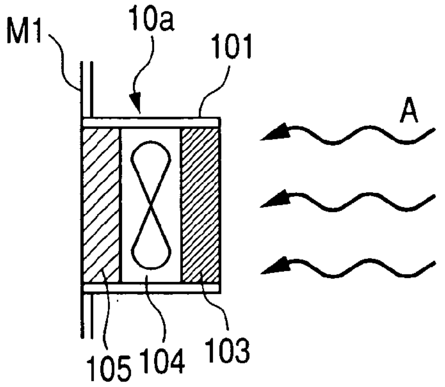
FIGS. 4A, 4B, 4C and 4D are vertical cross-sectional views showing other air discharge apparatuses.

For example, an air discharge apparatus 10*a*, shown in FIG. 4A, does not have a dust filter, and is provided, in order from the upstream side of the duct 101 (along the air flow therein), with an adsorption filter 103, a motor fan 104 and a VOC oxidation catalyst filter 105.

Figure 4B:
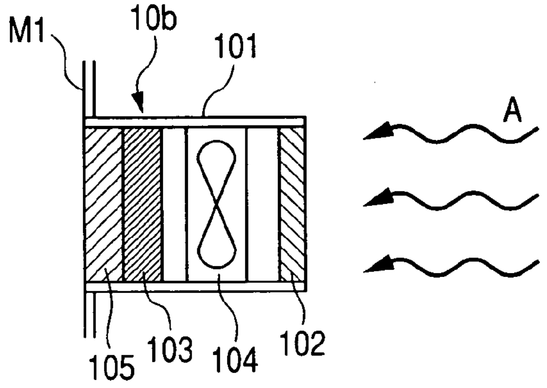

An air discharge apparatus 10*b*, shown in FIG. 4B, is provided, in order from the upstream side of the duct 101, with a dust filter 102, a motor fan 104, an adsorption filter 103, and a VOC oxidation catalyst filter 105.

Figure 4C:
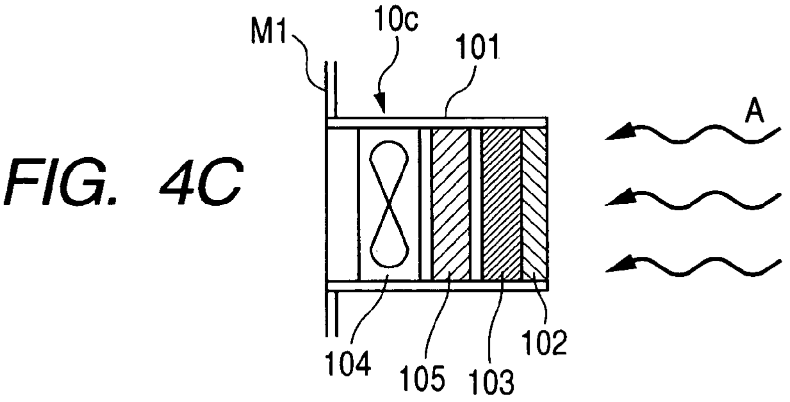

An air discharge apparatus 10*c*, shown in FIG. 4C, is provided, in the order from the upstream side of the duct 101, with a dust filter 102, an adsorption filter 103, a VOC oxidation catalyst filter 105, and a motor fan 104.

Figure 4D:
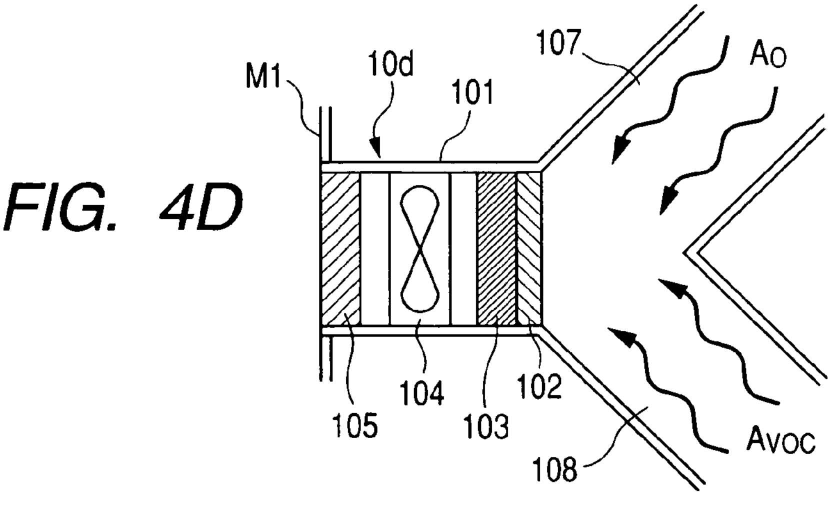

Also, an air discharge apparatus 10*d*, shown in FIG. 4D, is similar in filter arrangement to the embodiment 1 shown in FIG. 2, having, in order from the upstream side of the duct 101, a dust filter 102, an adsorption filter 103, a motor fan 104, and a VOC oxidation catalyst filter 105. It is different from the air discharge apparatus 10, shown in FIG. 2, in having a duct 107 for guiding air $A_O$ principally containing ozone and flying toner, and a duct 108 for guiding air $A_{VOC}$ principally containing VOCs. As explained in the foregoing, the ozone and flying toner are principally generated in the vicinity of the image forming portion 2, while the VOCs are principally generated in the vicinity of the fixing portion 4. Therefore, the air $A_O$ containing ozone and flying toner is guided by the duct 107, and the air $A_{VOC}$ containing VOCs is guided by the duct 107. These air flows $A_O$, $A_{VOC}$ are guided individually, are then united and passed by the ozone filter 103 and the VOC oxidation catalyst filter 105.

Also, there may be employed an integral filter including an adsorption filter 103 and a VOC oxidation catalyst filter 105 serially at the upstream and downstream sides along the air flow.

Also, in the present embodiment, the VOC oxidation catalyst filter 105 may be replaced by an ozone decomposition catalyst filter 106 (see, also, FIG. 3) as in the second embodiment.

In the foregoing, there has been explained a case wherein the main body M of the image forming apparatus is provided with a single air discharge apparatus, but plural air discharge apparatuses may be provided in the main body M of the image forming apparatus. In such a case, the ozone and the VOCs, generated in the main body M of the image forming apparatus, can be removed satisfactorily by constructing all of the air discharge apparatuses as those of the present invention, each including the adsorption filter 103 and the VOC oxidation catalyst filter 105. Otherwise, an air discharge apparatus, provided in a location of VOC generation (vicinity of the fixing portion 4 in embodiments 1-3) may be constructed as the air discharge apparatus of the present invention, including the adsorption filter 103 at the upstream side and the VOC oxidation catalyst filter 105 at the downstream side, and another air discharge apparatus may be constructed without the VOC oxidation catalyst filter 105. In this manner, the air discharge apparatus can be simplified to achieve a cost reduction.

The present invention has been explained by embodiments thereof, but the present invention is not limited to such an embodiment, and is subject to any and all modifications within the technical concepts of the invention.

What is claimed is:

1. An image forming apparatus comprising:

an image forming portion that forms a toner image on a recording material, said image forming portion being provided in a main body of said image forming apparatus;

a heating apparatus that heats the toner image on the recording material, said heating apparatus being provided in the main body;

a discharge path for discharging air in the main body to an exterior;

an adsorption filter provided in the discharge path and capable of removing, by adsorption, a compound in the air discharged through the discharge path; and a catalyst filter provided in the discharge path and capable of removing, by a catalytic decomposition, a compound in the discharged air, wherein the catalyst filter is provided at a downstream side of the adsorption filter, along a direction of air discharge.

2. An image forming apparatus as claimed in claim 1, further comprising a dust filter for dust removal, at an upstream side of the adsorption filter, along a direction of air discharge.

3. An image forming apparatus as claimed in claim 1, wherein the catalyst filter is capable of adsorbing and decomposing an organic compound.

4. An image forming apparatus as claimed in claim 1, wherein the discharge path includes an air-blowing member for blowing air toward the exterior.

5. An image forming apparatus as claimed in claim 4, wherein the air-blowing member is provided at a downstream side of the adsorption filter in a direction of air discharge.

6. An image forming apparatus as claimed in claim 5, wherein the air-blowing member is provided at an upstream side of the catalyst filter in the direction of air discharge.

* * * * *